United States Patent
Rogren et al.

(10) Patent No.: US 11,806,937 B2
(45) Date of Patent: Nov. 7, 2023

(54) METHOD FOR CREATING STRUCTURES OF TWO OR MORE MATERIALS USING A MULTI-MATERIAL THREE-DIMENSIONAL PRINTER

(71) Applicant: Sakuu Corporation, San Jose, CA (US)

(72) Inventors: Philip Eugene Rogren, Half Moon Bay, CA (US); Morteza Vatani, Los Gatos, CA (US)

(73) Assignee: Sakuu Corporation, San Jose, CA (US)

( * ) Notice: Subject to any disclaimer, the term of this patent is extended or adjusted under 35 U.S.C. 154(b) by 0 days.

(21) Appl. No.: 17/970,347

(22) Filed: Oct. 20, 2022

(65) Prior Publication Data

US 2023/0039713 A1 Feb. 9, 2023

Related U.S. Application Data

(63) Continuation of application No. 17/592,297, filed on Feb. 3, 2022, now Pat. No. 11,504,913, which is a
(Continued)

(51) Int. Cl.
*B29C 64/379* (2017.01)
*B29C 64/209* (2017.01)
(Continued)

(52) U.S. Cl.
CPC ............ *B29C 64/379* (2017.08); *B22F 10/14* (2021.01); *B22F 12/22* (2021.01); *B22F 12/224* (2021.01);
(Continued)

(58) Field of Classification Search
CPC .............................. B33Y 30/00; B29C 64/165
See application file for complete search history.

(56) References Cited

U.S. PATENT DOCUMENTS 5,204,055 A * 4/1993 Sachs ...................... B29C 41/12
264/432
5,593,531 A * 1/1997 Penn ................ G03G 15/04045
425/174.8 E
(Continued)

OTHER PUBLICATIONS

"indexing, n." OED Online, Oxford University Press, Mar. 2023, www.oed.com/view/Entry/94378. Accessed Mar. 21, 2023. (Year: 2023).*

*Primary Examiner* — Benjamin A Schiffman
(74) *Attorney, Agent, or Firm* — NovoTechIP International PLLC

(57) ABSTRACT

A multi-material three-dimensional printing apparatus is provided. The provided apparatus includes two or more print stations. Each of the print stations includes a substrate, a transportation device, a dispersion device, a compaction device, a printing device, a fixing device, and a fluidized materials removal device. The apparatus also includes an assembly apparatus in communication with the two or more print stations via the transportation device. The apparatus also includes one or more transfer devices in communication with the assembly apparatus. The apparatus also includes a computing and controlling device configured to control the operations of the two or more print stations, the assembly apparatus and the one or more transfer devices.

23 Claims, 10 Drawing Sheets

Related U.S. Application Data continuation of application No. 16/167,088, filed on Oct. 22, 2018, now Pat. No. 11,273,608.

(60) Provisional application No. 62/682,067, filed on Jun. 7, 2018.

(51) Int. Cl.

| | | |
|---|---|---|
| *B29C 64/165* | (2017.01) | |
| *B33Y 40/00* | (2020.01) | |
| *B33Y 30/00* | (2015.01) | |
| *B29C 64/171* | (2017.01) | |
| *B29C 64/236* | (2017.01) | |
| *B29C 64/245* | (2017.01) | |
| *B29C 64/336* | (2017.01) | |
| *B22F 10/14* | (2021.01) | |
| *B22F 12/00* | (2021.01) | |
| *B22F 12/33* | (2021.01) | |
| *B22F 12/53* | (2021.01) | |
| *B22F 12/60* | (2021.01) | |
| *B22F 12/84* | (2021.01) | |
| *B22F 12/88* | (2021.01) | |
| *B33Y 10/00* | (2015.01) | |
| *B33Y 50/02* | (2015.01) | |
| *B33Y 70/10* | (2020.01) | |
| *B22F 12/63* | (2021.01) | |

(52) U.S. Cl.
CPC ............ *B22F 12/33* (2021.01); *B22F 12/53* (2021.01); *B22F 12/60* (2021.01); *B22F 12/84* (2021.01); *B22F 12/88* (2021.01); *B29C 64/165* (2017.08); *B29C 64/171* (2017.08); *B29C 64/209* (2017.08); *B29C 64/236* (2017.08); *B29C 64/245* (2017.08); *B29C 64/336* (2017.08); *B33Y 30/00* (2014.12); *B33Y 40/00* (2014.12); *B22F 12/63* (2021.01); *B33Y 10/00* (2014.12); *B33Y 50/02* (2014.12); *B33Y 70/10* (2020.01)

(56) References Cited

U.S. PATENT DOCUMENTS

| | | | | |
|---|---|---|---|---|
| 6,066,285 | A * | 5/2000 | Kumar | B33Y 30/00 264/603 |
| 6,376,148 | B1 * | 4/2002 | Liu | B22F 10/10 156/273.1 |
| 6,780,368 | B2 * | 8/2004 | Liu | G05B 19/4099 264/494 |
| 8,216,757 | B2 * | 7/2012 | Mizutani | G03G 9/08782 430/137.14 |
| 8,488,994 | B2 * | 7/2013 | Hanson | B33Y 10/00 399/130 |
| 8,568,951 | B2 * | 10/2013 | Watanabe | G03G 9/08755 430/110.2 |
| 8,879,957 | B2 * | 11/2014 | Hanson | B33Y 10/00 399/130 |
| 9,482,974 | B2 * | 11/2016 | Martin | G03G 9/0904 |
| 9,688,027 | B2 * | 6/2017 | Batchelder | G03G 15/24 |
| 9,885,987 | B2 * | 2/2018 | Chillscyzn | G03G 15/24 |
| 10,071,527 | B2 * | 9/2018 | Travers | B29C 64/147 |
| 10,272,664 | B2 * | 4/2019 | Hays | G03G 15/1625 |
| 10,940,533 | B2 * | 3/2021 | Hudelson | B22F 3/004 |
| 11,224,917 | B1 * | 1/2022 | Rogren | B22F 10/28 |
| 2004/0173946 | A1 * | 9/2004 | Pfeifer | B22F 12/67 219/121.6 |
| 2013/0186549 | A1 * | 7/2013 | Comb | B29C 65/02 425/90 |
| 2013/0186558 | A1 * | 7/2013 | Comb | B29C 64/147 156/277 |
| 2014/0167326 | A1 * | 6/2014 | Jones | B29C 64/141 264/447 |
| 2017/0348909 | A1 * | 12/2017 | Clark | B29C 64/40 |

\* cited by examiner

METHOD FOR CREATING STRUCTURES OF TWO OR MORE MATERIALS USING A MULTI-MATERIAL THREE-DIMENSIONAL PRINTER

CROSS-REFERENCE TO RELATED APPLICATIONS

This application claims priority to U.S. patent application Ser. No. 17/592,297, entitled "MULTI-MATERIAL THREE-DIMENSIONAL PRINTER" which was filed on Feb. 3, 2022, which claims priority to U.S. patent application Ser. No. 16/167,088, entitled "MULTI-MATERIAL THREE-DIMENSIONAL PRINTER" which was filed on Oct. 22, 2018, and which claims priority to U.S. Provisional Patent Application No. 62/682,067 entitled "MULTI-MATERIALS 3D PRINTER", filed Jun. 7, 2018, the contents of all of which are incorporated herein by reference in their entirety.

FIELD OF THE INVENTION

The present invention relates to three-dimensional printing systems and associated methods for creating structures of two or more materials.

BACKGROUND

The introduction of three-dimensional printing has generated a high degree of interest in the potential for a faster and more economical manufacturing approach. To date, however, that potential has largely gone unfulfilled. The vast majority of three-dimensional printers are used to make demonstration parts or nonfunctional prototypes. In large part, most of the demonstration parts or nonfunctional prototypes are made of plastic material that is chosen primarily for compatibility with the printer rather than the materials requirement of the final part. There are a few notable exceptions for high value parts. For example, joint replacements can be produced with energy beam melting three-dimensional printers and complex sand casting cores made with jetted binder three-dimensional printers.

Both of these three-dimensional printers employ powder-bed technology, but with different approaches to fixing the powder into the desired configuration. Both applications benefit from the ability to use technical materials chosen for the application as opposed to plastics chosen either for their melting and solidification properties for a fused deposition modeling machine or their polymerization properties for use in vat polymerization machine. The jetted binder three-dimensional printer further benefits from the ability to rapidly deposit a full layer of powder and fix the desired pattern with a high-speed ink jet like print head. The most significant limiting factor of a jetted binder type three-dimensional printer is the restriction to a single material within each layer.

Therefore, there is a need to provide a three-dimensional printer capable of leveraging the powder bed and jetted binder technology to address the single material limitation.

SUMMARY

A multi-material three-dimensional printing apparatus is provided. The provided apparatus includes two or more print stations. Each of the print stations includes a substrate, a transportation device, a dispersion device, a compaction device, a printing device, a fixing device, and a fluidized materials removal device. The apparatus also includes an assembly apparatus in communication with the two or more print stations via the transportation device. The apparatus also includes one or more transfer devices in communication with the assembly apparatus. The apparatus also includes a computing and controlling device configured to control the operations of the two or more print stations, the assembly apparatus and the one or more transfer devices.

In some embodiments of the disclosure, the transfer device is configured to transfer a printed layer from the substrate onto at least one of a build substrate or onto a printed layer of a stack of printed layers previously affixed to the build substrate. Furthermore, the transfer device can include a pick-up assembly including an attachment device configured to remove the printed layer from the substrate. In some embodiments, the attachment device includes a vacuum device or an adhesive device configured to overcome a force holding the printed layer to the substrate. The transfer device can include a translation device configured to move the printed layer from the substrate to the assembly apparatus.

In some embodiments, the fluidized materials removal device includes a vacuum device, a disruptive device, and an air knife. Furthermore, the fluidized materials removal device can be configured to remove all of the fluidized material deposited and compacted onto the substrate.

In some embodiments, the fixing device is configured to provide at least one radiant energy source selected from the group of IR radiation, UV radiation, and electron beam. The printing device can include an ink jet type print head with jetting nozzles spanning the width of the substrate. In alternative embodiments, the printing device includes an ink jet type print head with fewer jetting nozzles required to span the width of the substrate.

In some embodiments, the compaction device includes a settling device configured to provide vibration and at least one of a compliant pressure cuff or a roller. The compaction device can be configured to compact a fluidized material to a high density of at least 40% of the theoretical density of the fluidized material.

Additional features and advantages of the disclosure will be set forth in the description that follows, and in part, will be obvious from the description; or can be learned by practice of the principles disclosed herein. The features and advantages of the disclosure can be realized and obtained by device of the instruments and combinations particularly pointed out in the appended claims. These and other features of the disclosure will become fully apparent from the following description and appended claims, or can be learned by the practice of the principles set forth herein.

BRIEF DESCRIPTION OF THE DRAWINGS

In order to describe the manner in which the above-recited disclosure and its advantages and features can be obtained, a more particular description of the principles described above will be rendered by reference to specific examples illustrated in the appended drawings. These drawings depict only example aspects of the disclosure, and are therefore not to be considered as limiting of its scope. These principles are described and explained with additional specificity and detail through the use of the following drawings.

DETAILED DESCRIPTION

Figure 1:
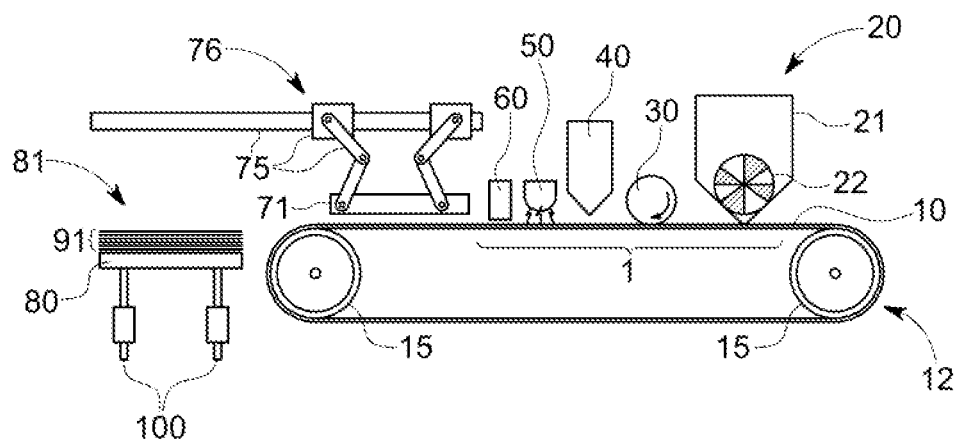
FIG. 1 illustrates a schematic representation of a print station and assembly apparatus with a continuous substrate, in accordance with an embodiment of the disclosure.

The present invention is described with reference to the attached figures, where like reference numerals are used throughout the figures to designate similar or equivalent elements. The figures are not drawn to scale, and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

In view of the foregoing, embodiments disclosed herein are directed to three-dimensional printing systems and associated methods for creating structures of two or more materials. The disclosed three-dimensional printing systems leverages the powder bed and jetted binder technology to address the single material limitation. The present disclosure teaches building up the structure in layers, each layer including of one or more materials. The disclosed method also teaches patterning each of the individual materials of each layer and combining those individual materials slices into the desired three-dimensional structure, through the use of computer-aided design and drafting (CAD) software. As each material in each layer is printed, it is stacked on previously printed layers in sequence to generate the desired structure in three dimensions and in two or more materials.

While three-dimensional printers based on Fused Deposition Modeling (FDM) and extrusion are capable of depositing multiple materials or multiple colors of very similar materials, both of these techniques for three-dimensional printing are extremely slow and offer very limited materials sets. The present disclosure teaches powder bed and jetted binder technology which accommodates materials deposition rates adequate to be cost competitive with conventional discrete assembly and subtractive forming processes. Furthermore, jetted binder technology affords flexibility in materials that allows application of an extremely wide range of organic and inorganic materials.

Furthermore, a conventional jetted binder three-dimensional printer builds up a three-dimensional structure by depositing and compacting a full layer of a single material directly on a previous layer and defining the pattern by applying a binder to the deposited powder layer. Any powder in a given layer that is not fixed in place by the jetted binder is left in place to continue a flat and level surface to receive subsequent layers of powder. The present disclosure teaches creating each material for each layer on a substrate, where the substrate can be associated with a part of, or affixed to a transport device. The transport device can be separate from an assembly apparatus where individually printed layers are assembled in order to create the desired three-dimensional object. The present disclosure also teaches a materials deposition and patterning system (collectively a print station) for each of the materials.

Each of the print stations can include a dispensing device capable of dispensing a fluidized material in a uniform and dense layer on a substrate. Each print station can further include a compaction device capable of compacting the deposited fluidized material to have an apparent density of at least 40% of the theoretical density of the fluidized material. Each print station can also include a printing device capable of dispensing a liquid binding material in a precise pattern, where the pattern and dispensing driven by pre-set CAD design in a fully automated fashion. Each print station can also include a fixing device configured to cure the liquid binder material to solidly fix the portions of the fluidized material exposed to the liquid binding material. Each print station can also include material removal device configured to remove portions of the fluidized material dispersed by the dispersing device, that was not exposed by the liquid binding material dispersed by the printing device. The substrate can be configured to transfer the portion of the fluidized material fixed in place by the cured liquid binding material, a printed layer, to the assembly apparatus. The assembly apparatus can also include a transfer device capable of transferring the printed layer precisely onto a build substrate, or onto a printed layer of a stack of printed layers previously affixed to the build substrate. Any single complete layer on the build substrate or stack of layers can include printed layers from one or more print station, aligned such that empty portions of one printed layer are filled precisely with different materials of other printed layers from another print station.

FIG. 1 schematically depicts a print station and an assembly apparatus with a continuous substrate, in accordance with an embodiment of the present disclosure. The print station can include a carrier device 12. In some embodiments, the carrier device 12 can include a conveyor configured to transport or move materials from a first position to a second position. The conveyor can include a belt and two rotating elements 15, configured to rotate in the same direction to advance the belt in a certain direction. The carrier device 12 can have a distal end and a proximal end. The carrier device 12 can transport a substrate 10 from the distal end to the proximal end. The substrate 10 can be positioned by the two rotating elements 15 to a location where a transfer device 76 can transport a printed layer (not shown in FIG. 1) to a build substrate 80.

At the distal end of the carrier device 12, a dispensing device 20 can be provided. The dispensing device 20 can simply be a dispenser configured to dispense fluidized material. The dispensing device 20 can include a materials storage 21 and a dispensing controller 22. The dispensing controller 22 can be configured to precisely meter an amount of fluidized material deposited onto a substrate 10. The dispensing controller 22 can also be configured to precisely control the uniformity of the deposited fluidized material.

Near the distal end of the carrier device 12, a compaction device 30 can be provided. In some embodiments, the compaction device 30 can include a roller, made up of a hardened metal material designed as a cylindrical tube. In other embodiments, the compaction device 30 can include a compliant pressure cuff, or another device configured to apply a controlled pressure orthogonal to the plane of the deposited fluidized material and the substrate 10. The compaction device 30 can also include a settling device configured to provide vibration. The vibration of the compaction device 30 can improve the distribution and compaction of the fluidized material. In some embodiments, the compaction device 30 can be configured to compact a fluidized material to a high density of at least 40% of the theoretical density of the fluidized material.

Near the distal end of the carrier device 12, a printing device 40 can be provided. The printing device 40 can be configured to deposit a liquid binding material to fix a precise pattern into the fluidized material. The precise pattern can be fixed into the fluidized material by binding the fluidized material into a connected and robust mass. In some embodiments, the printing device 40 can be an ink jet type print head under direct control of a computer (not shown). The computer can be instructed using a set of patterning instructions, for instance a pre-set CAD design.

The printing device 40 can include an ink jet type print head with jetting nozzles spanning the width of the substrate 10. The ink jet type print heads can also be positioned at a sufficient density to achieve a desired print resolution. The ink jet type head can be fixed in position and the functioning of each jetting nozzle can be coordinated with the movement of the substrate 10 on the rotating elements 15, to create the desired pattern in the fluidized material.

In alternative embodiments, the printing device 40 can include an ink jet head that includes fewer jetting nozzles than are required to span the width of substrate 10, and yet achieves a desired resolution. The ink jet type head can be movable, under computer control, across the width of the substrate 10, and the movement of both the ink jet type print head and the rotating elements 15 may be coordinated to achieve the desired fixed printed pattern in the fluidized material.

Near the center of the carrier device 12, a fixing device 50 can be provided. The fixing device 50 can be configured to solidify the liquid binding material, thus fixing the fluidized material exposed to the liquid binding material in a robust solid pattern. The fixing device 50 can be a source of radiant energy that may interact with the liquid binding material to cause it to become solid. In some embodiments, the radiant energy can be IR radiation, UV radiation, electron beam, or other known radiation types. It should be understood the fixing device 50 does not need to be limited to the disclosed radiation types, as this list is presented for exemplary embodiments and not intended to be exhaustive. Alternatively, the fixing device 50 can include a device for dispersing a reactive agent. The reactive agent can be configured to react with the liquid binding material and the fluidized material to convert the fluidized material to a robust mass.

Figure 8:
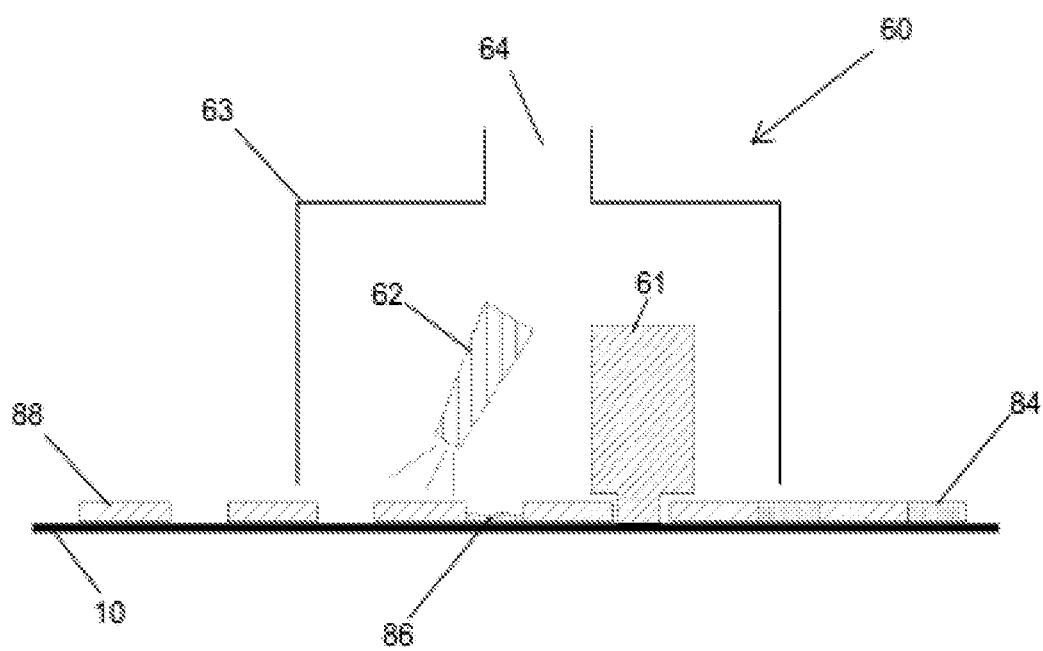
FIG. 8 illustrates a schematic representation of a fluidized materials removal device, in accordance with an implementation of the disclosure.

A fluidized materials removal device 60 can be provided downstream from the fixing device 50. The fluidized materials removal device 60 can be configured to remove all of the fluidized material deposited and compacted onto the substrate 10. The fluidized materials removal device 60 can remove the fluidized material deposited and compacted onto the substrate, but not fixed in place by the liquid binder material. Referring momentarily to FIG. 8, the fluidized materials removal device 60 is illustrated in greater detail.

The fluidized material removal device 60 can include an enclosure 63. The enclosure can have a distal end and a proximal end. The printed layer 88 can be transported from the distal end of the enclosure 63 to the proximal end along the substrate 10. The enclosure 63 can include a disruptive device 61, such as a brush or a probe to loosen compacted powder 84. Any residual powder 86 can be further dislocated by an air knife device 62. The disruptive device 61 can be designed to have disruptive strength sufficient to disrupt compacted powder that has not been fixed in place. The disruptive device 61 is configured to not remove any compacted powder which has been treated with binder and fixed by the fixing device 50 of FIG. 1. When the non-fixed compacted powder 84 is fully dislodged and aerosolized within enclosure 63, some fixed powder 88 can remain attached to substrate 10. The aerosolized compacted powder 84 can be removed from the substrate by the vacuum port 64. It should be understood, that other exemplary embodiments of the fluidized materials removal device 60 may contain more or less devices than enumerated herein.

Referring back to FIG. 1, a transfer device 76 can be implemented downstream from the fluidized materials removal device 60 in the assembly apparatus. The transfer device 76 can be configured to move a printed layer (shown in FIG. 2 as reference 90) from the substrate 10. The printed layer 90 can be moved from the substrate 10 to a build substrate 80, or to the top of a stack of previously positioned layers 91. The transfer device 76 can also include a pick-up assembly. The pick-up assembly can include an attachment device 71 configured to remove a printed layer 90 from the substrate 10. The attachment device 71 can include a vacuum device or an adhesive device to overcome the force holding the printed layer 90 to the substrate 10. The transfer device 76 may also include a translation device 75 configured to move the printed layer 90 from the substrate 10 to an assembly apparatus 81.

Figure 9:
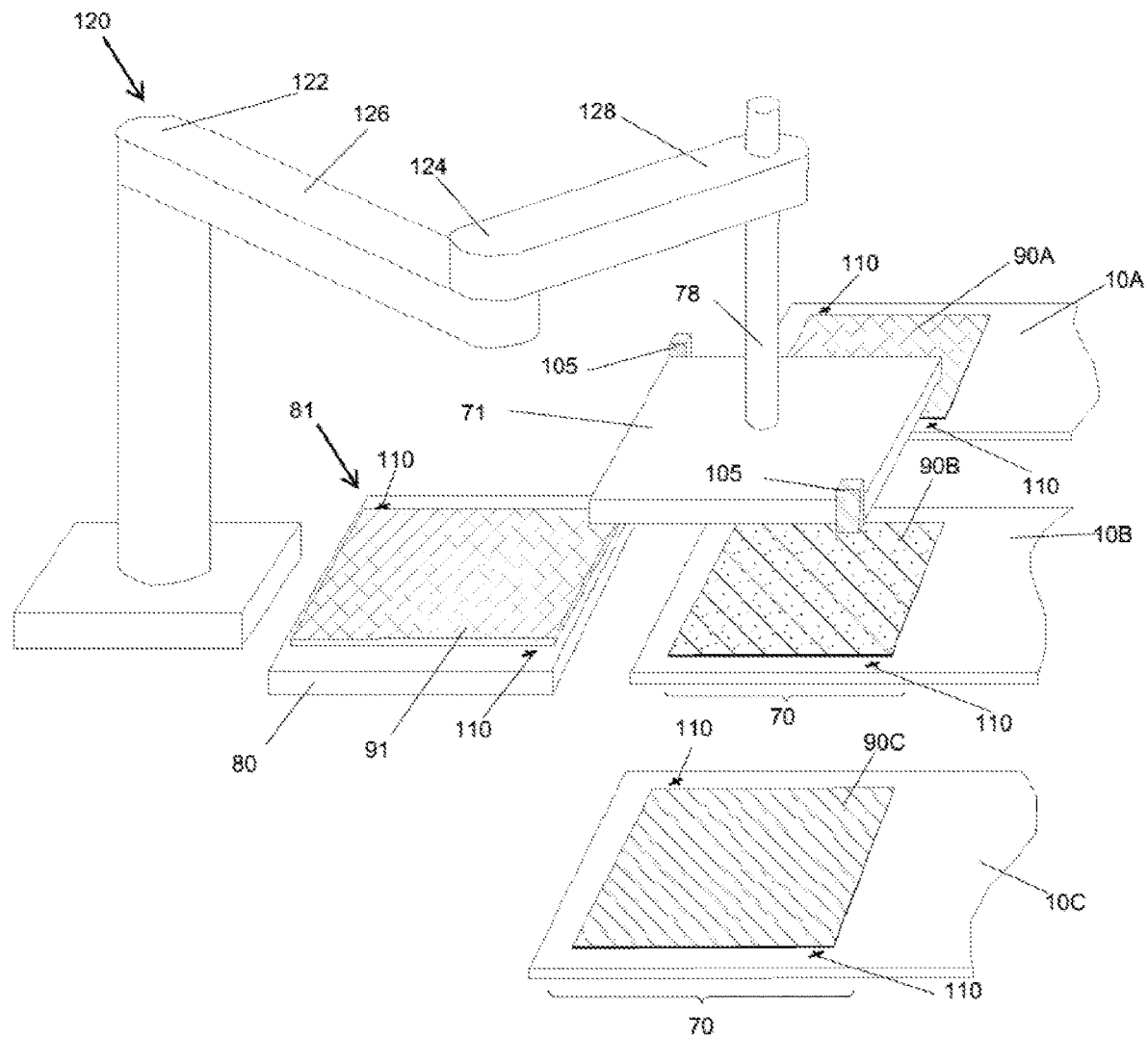
FIG. 9 illustrates a schematic representation of an alternative embodiment of the transfer device, in accordance with an implementation of the disclosure.

Referring momentarily to FIG. 9, an alternative embodiment of the transfer device 120 is illustrated. The transfer device 120 can include an end effector 78, which may be in communication with an attachment device 71. The transfer device 120 can be configured to accurately position the attachment device 71 relative to the printed layer 90 on a substrate 10. The end effector 78 can cause the attachment device 71 to remove the printed layer 90 from the substrate 10. The substrate 10 can include alignment fiducials 110 to enable coordination with the alignment sensor 105. The end effector 78 can also provide an accurate vertical and rotational translation for the attachment device 71 while coordinating between joint one 122 acting on an inner arm 126 and joint two 124 acting on an outer arm 128.

FIG. 9 also illustrates an alternate arrangement of the print stations. In some embodiments, the print stations can be oriented in a single row. The transfer device 120 can be positioned at any location that provides the attachment device 71 access to any one of printed layers on the substrates. The build platform 80 can be located anywhere within the range of the transfer device 120. As discussed above with respect to FIG. 1, the build platform 80 can include an elevator device. In an alternative embodiment, the build platform 80 can be fixed and the attachment device 71 can be raised or lowered using the end effector 78.

The printed layers 90A, 90B, and 90C each represent the product of three print stations 1, each producing printed layers with different materials. For the purposes of building a multi-material product, at least two print stations are required. It should be noted, however, there is no maximum number of print stations that can be incorporated into the multi-material print system. In some embodiments, the assembly apparatus 81 can include a build plate 80, alignment fiducials 110, and an elevator device 100 (see FIGS. 1 and 3). The build plate 80 can also include an adhesion modifying device (not shown) configured to maintain the position of the build product while enabling an easy release after the build is complete. The adhesion modifier device can modify the adhesion by stimulating the interface between the first printed layer and the build plate 80 with thermal, electrical, magnetic or mechanical stimulus.

Referring back to FIG. 1, the elevator device 100 is configured to maintain the level of the top of the stack of previously positioned layers 91. In a preferred embodiment, the elevator device 100 can include lead screws. In an alternate embodiment, the elevator device 100 can include a linear motor device. Referring back to FIG. 9, the alignment fiducials 110 can be provided to facilitate precise alignment of printed layers on the build plate 80 and on the top of previously positioned layers 91. The alignment fiducials 110 can be used in coordination with the alignment sensor 105 and the computer control system to precisely align the printed layer 90 with the top of the stack of previously positioned layers 91. The alignment fiducials can be incorporated in the surface of the build plate 80. In an alternate embodiment, the alignment fiducials 110 can project from the surface of the build plate 80. In yet another embodiment of the build plate 80, the alignment fiducials 110 can project from the surface of the build plate 80 by a distance proportional to height of the current printed layer.

The attachment device 71 can also include alignment sensors 105 that are aligned with the alignment fiducials 110 when a printed layer 90 is prepositioned. In some embodiments, the alignment sensor 105 and alignment fiducial 110 can be designed in concert to enable the alignment sensor 105 to sense the position relative to the alignment fiducials 110 to within 0.01 mm. The alignment sensor 105 can be an optical sensor, a laser sensor, a magnetic sensor, an ultrasonic sensor, or a mechanical sensor. Multiple alignment sensors and associated alignment fiducials 110 can make up the alignment system for precise alignment between the attachment device 71, the build plate 80, and the substrates 10.

Figure 10:
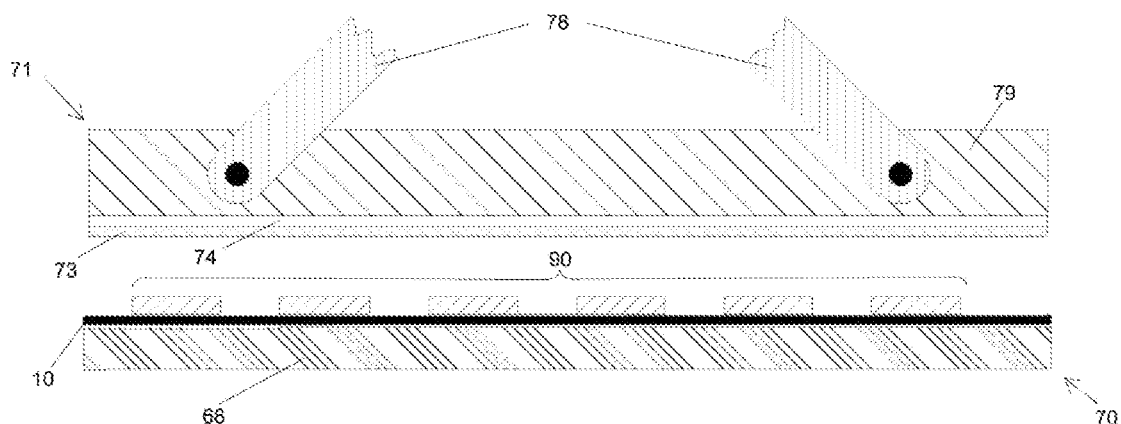
FIG. 10 of an alternative embodiment of the attachment device, in accordance with an implementation of the disclosure.

The attachment device 71 is described in further detail with respect to FIG. 10. The attachment device 71 can include an attachment device base 79, an adhesive device 73, and an adhesion modifier 74. The attachment device base 79 can be connected to the end effector 78. The adhesive device 73 can include a vacuum device (not shown) and an adhesive surface device. In some exemplary embodiments, the adhesive surface device can include a jell pad, a micro hair device, or a static electric device. It should be understood that other adhesive surface devices can be implemented herein. The strength of the adhesion can be modified by applying a stimulus to the adhesive device 73 with an adhesion modifier 74. For example, the adhesion modifier 74 can be configured to apply thermal, electrical, magnetic or mechanical stimulus to the adhesion device 73.

The transfer station 70 can also include a section of substrate 10 and an adhesion reducing device 68. A printed layer 90 can be cycled into the transfer station 70 by movement of the substrate 10. The printed layer 90 can be adhered to the surface of substrate 10 by the adhesive properties of a fixed powder in contact with the surfaces of substrate 10. The surface of the substrate 10 or discrete platform 11 may be designed to provide a predetermined adhesive force with fixed powder 88. The adhesion reducer 68 can provide a stimulus to an interface between the fixed powder 88 and a surface of the substrate 10 to reduce the adhesive force to facilitate an easy transfer of the printed layer (not shown) to the attachment device 71. The stimulus provided by the adhesion reducing layer 68 can be thermal, electrical, magnetic or mechanical. In some embodiments, transfer of the printed layer 90 from the substrate 10 to the attachment device 71 can be facilitated by directed contact to the adhesive device 73. In some embodiments, transfer of the printed layer 90 from the substrate 10 to the attachment device 71 can be facilitated by activation of an adhesion modifier 74, or activation of the adhesion reducer 68, or a combination both.

Figure 11:
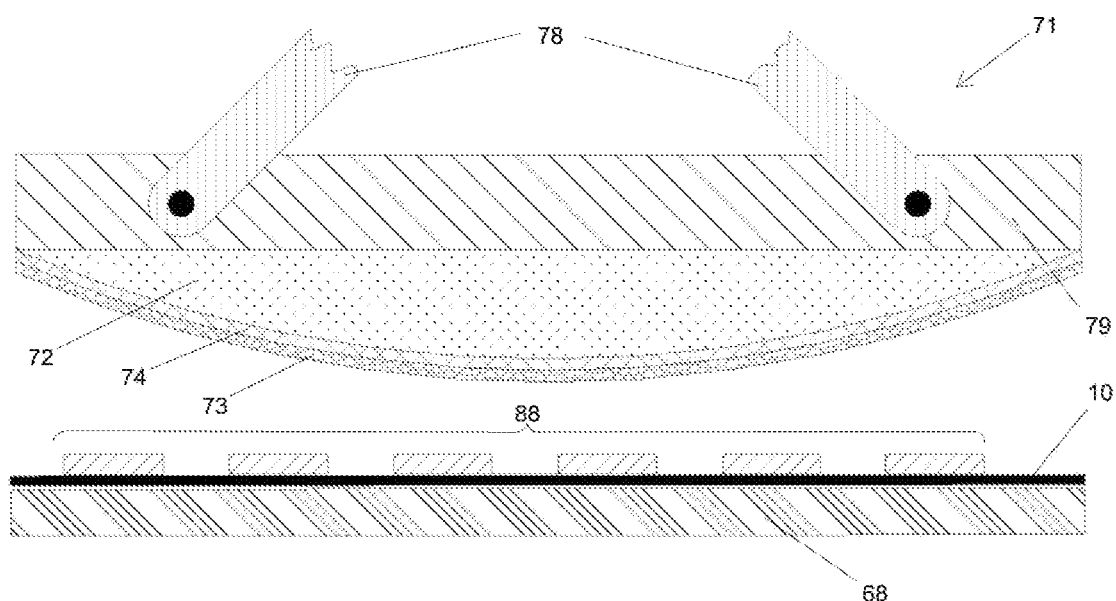
FIG. 11 of an alternative embodiment of the attachment device, in accordance with an implementation of the disclosure.

FIG. 11 illustrates another embodiment of the attachment device 71. The attachment device 71 of FIG. 11 can further include a shape modifier 72. The shape modifier 72 can provide a peeling action in order to better facilitate the transfer of a printed layer 88 from the substrate 10 to the adhesive device 73. The shape modifier 72 can include a preformed curved structure. The curved structure can be made up of an elastic material that can be flattened by mechanical pressure applied normal to the curved surface. In an alternative embodiment of attachment device 71, the shape modifier 72 can be an adjustable structure that may be modified to form a flat surface or a curved surface by the application of pneumatic, hydraulic or mechanical force.

Figure 12:
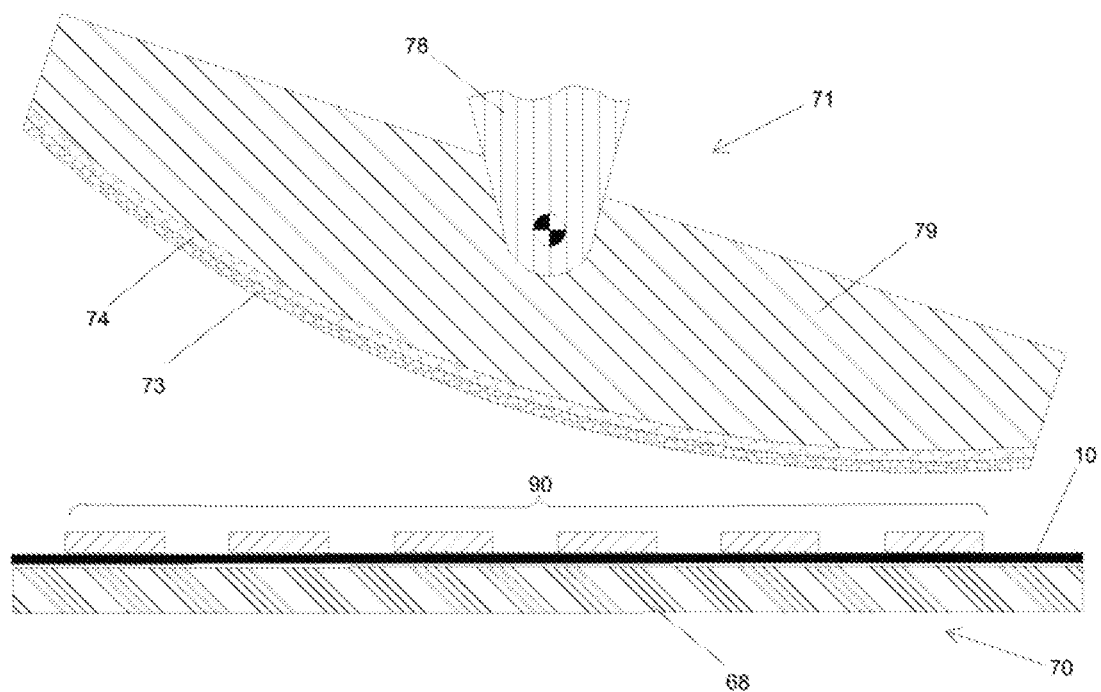
FIG. 12 of an alternative embodiment of the attachment device, in accordance with an implementation of the disclosure.

FIG. 12 illustrates another embodiment of the attachment device 71. The attachment device 71 of FIG. 12 can further include an attachment device base 79 with a rounded surface. the attachment device base 79 can include the adhesive device 73 and the adhesion modifier 73, as described above. The attachment device 71 can also be configured to pivot about the end effector 78 such that the attachment device 71 can be configured to roll and peel the printed layer 90. The peeling action can provide greater control of the transfer of the printed layer 90 from the substrate 10 to the adhesive device 73, and from the adhesive device 73 to previously positioned layers.

Referring back to FIG. 1, the print station can deploy a continuous web. The continuous web can be a loop of material, returning to the beginning of the print station 1 after a printed layer 90 is released to the transfer device 76. The continuous web can be an elongated structure such as a roll of robust polymer film or a roll of metal foil. The continuous web can pass through the print station 1 a single time and may then be removed from the print station to be discarded or recovered.

Figure 2:
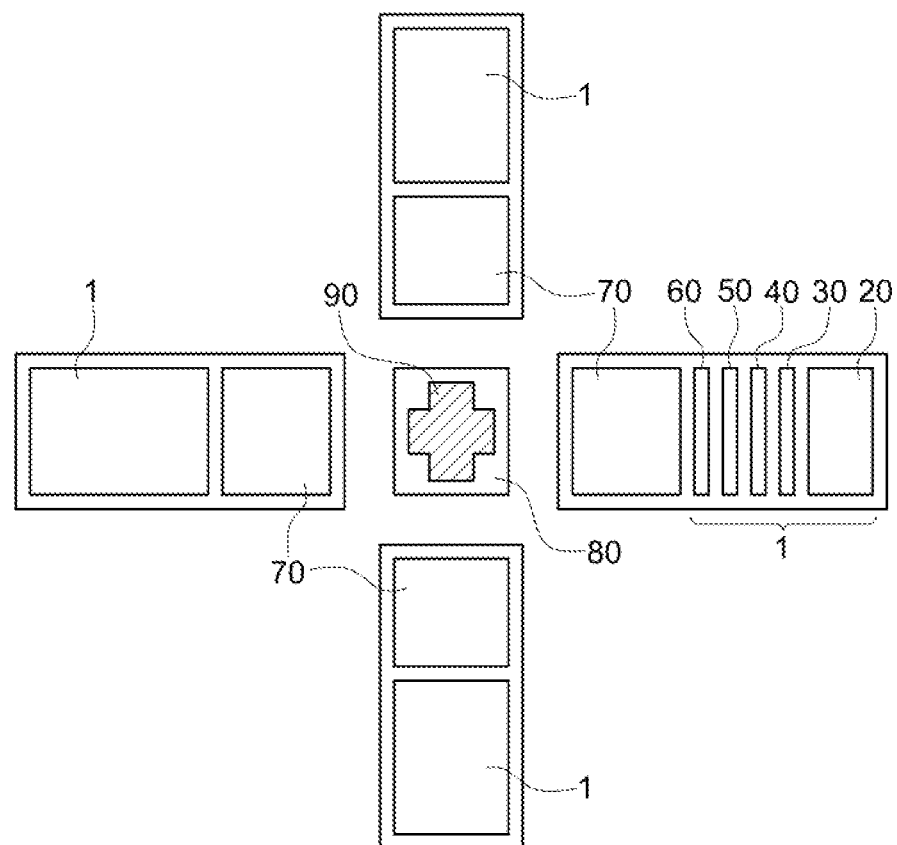
FIG. 2 illustrates a schematic representation of a multi-material three-dimensional printer, in accordance with an embodiment of the disclosure.

FIG. 2 illustrates a schematic representation of a multi-material three-dimensional printer, in accordance with an embodiment of the present disclosure. The three-dimensional printer can include multiple work stations. Each work station can include a transfer station 70 and a print station 1. The print station 1 can include the substrate 10, rotating elements 15, dispensing device 20, compaction device 30, printing device 40, fixing device 50 and fluidized fluid material removal device 60 of FIG. 1. The transfer station 70 can include the transfer device 76 and all of its components. The multi-material three-dimensional printer can include a single print station 1 for each different material to be included in the final printed part. Each print station can contribute one material to each complete layer of the final printed part. Furthermore, each complete layer in the final printed part can include as little as one material to as many materials as there are print stations. Each material can be transferred onto to the build substrate 80, or to the top of a stack of previously positioned layers 91 and positioned in precise alignment with alignment fiducials associated with the build substrate 80. The alignment is considered complete and precise where the top surface of the printed material is coplanar and no subsequent material is present within the top surface.

While FIG. 2 exemplifies a single transfer device 76 for each print station 1, in some embodiments the transfer device 76 can be configured to access the transfer locations 70 of each print stations 1. In this embodiment, the transfer device 76 can be configured to transfer a printed layer 90 from each of the print stations to build the substrate 80 or to the top of a stack of previously positioned layers 91. The transfer device 76 can be configured to transfer a printed layer 90 to the top of the stack previously positioned layers 91 in precise alignment with alignment fiducials associated with the build substrate 80. In an alternative embodiment, the transfer device 76 can be provided for each print station 1. Each transfer device 76 can be configured to precisely transfer a printed layer 80 from the associated transfer location 70 to build substrate 80 or to top a stack of previously positioned layers 91.

In another alternative embodiment, the ratio of transfer devices 76 to print stations 1 can vary by any number based on printing needs and strategies. Regardless of the number of transfer devices 76, each transfer device 76 can be capable of precisely transferring a printed layer 90 from the associated transfer location 70 to build a substrate 80 or to top a stack of previously positioned layers 91.

The multi-material three-dimensional printer can also include a single assembly apparatus 81. In this embodiment all of the layers of a subject build are stacked one upon the last with one to several different materials in each layer, the constituents of each layer bonded securely to the next. The final structure can be a solid mass including monolithic structures of at least two different materials. Each of the two or more distinct material structures can be contiguous with at least one other distinct material structure. The distinct material structures can be made up of material from only one printed layer or from material from two or more printed layers. The assembly apparatus 81 can include a build substrate 80. In some embodiments, the build substrate 80 can be equipped with a surface designed to hold the stack of previously positioned layers 91 throughout the build process. The surface holding the stack can also be configured to facilitate removal of the subject from the build substrate 80 at the completion of the build process. The assembly apparatus 81 can also include position reference fiducials to facilitate accurate placement of each printed layer. In some embodiments, the build substrate 80 can be positioned in a fixed location during the build process. In alternative embodiments, the build substrate 80 can include an elevator device 100 to present the top surface of the stack of previously positioned layers 91 at a desired elevation relative to other components of the multi-material three-dimensional printer.

The multi-material three-dimensional printer can also include a computing and control device. The computing and control device can be capable of interpreting print instructions, for instance from a pre-set CAD design, to direct and coordinate the operation of all of the major components. When supplied with the raw materials required for the desired structure, the computing and control device can autonomously produce the desired three-dimensional parts made up of two or more materials. The computing and control device is described below in greater detail with respect to FIG. 6.

Figure 3:
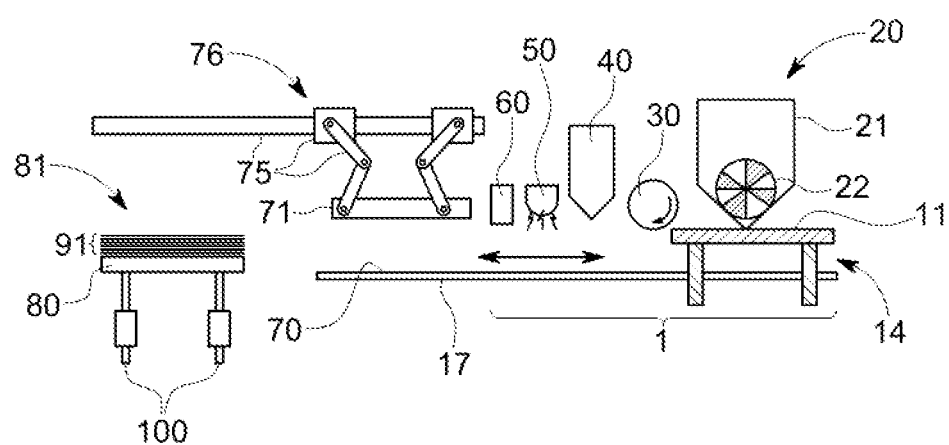
FIG. 3 illustrates a schematic representation of the print station and assembly apparatus with an alternative carrier device, in accordance with an embodiment of the disclosure.

FIG. 3 schematically depicts an alternative print station and an assembly apparatus with a continuous substrate, in accordance with an embodiment of the present disclosure. A carrier device 14 can include a discrete platform 11. The discrete platform 11 can be advanced towards the build substrate 80 via a transport device 17. The discreet platform 11 can shuttle through the print station 1 and to the transfer device 76. The present embodiment can deploy a continuous web. The continuous web can be a loop of material, returning to the beginning of the print station 1 after a printed layer 90 is released to the transfer device 76. The continuous web can be an elongated structure such as a roll of robust polymer film or a roll of metal foil. The continuous web can pass through the print station 1 a single time and may then be removed from the print station to be discarded or recovered.

Figure 4:
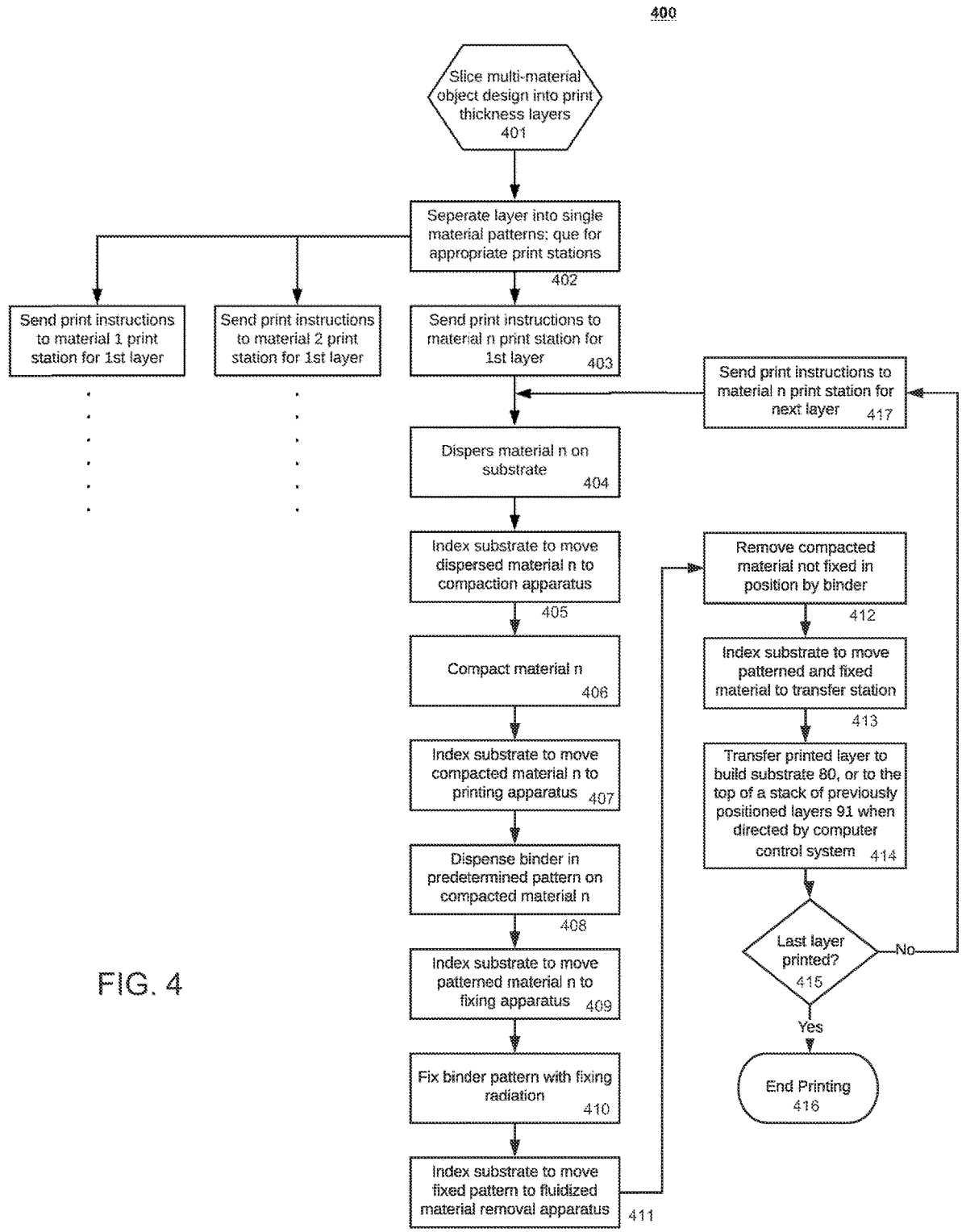
FIG. 4 depicts a flow chart describing a process for creating structures of two or more materials by each print station, in accordance with an implementation of the disclosure.

FIG. 4 depicts a flow chart describing the process 400 for creating structures of two or more materials by each print station 1 (of FIG. 2), in accordance with an implementation of the present disclosure. The following description of the process 400 is described in detail with reference to the components of the three-dimensional printer of FIG. 2. The process 400 starts at step 401, where a multi-material object design is divided into print thickness layers. The layers are then separated into single material patterns at step 402. Each single material pattern can be sent to a print station 1 of the three-dimensional printer. Each print station 1 can perform the steps 403 through 417 for each single material pattern.

A print station 1 can receive print instructions to a material for a first layer at step 403. The print station 1 can perform the steps 403 through 417 for each layer of the multi-material object design. At step 404, the material of the single material pattern for the first layer can be dispersed on a substrate. At step 405, the substrate can be indexed to move the dispersed material to a compaction apparatus. The material is compacted at step 406. At step 407, the substrate can be indexed to move the dispersed material to a printing apparatus. At step 408, a binder can be dispersed in a predetermined pattern on the compacted material. At step 409, the substrate can be indexed to move the patterned material to a fixing apparatus. The binder pattern can be fixed with fixing radiation, at step 410. At step 411, the substrate can be indexed to move the fixed pattern to a fluidized material removal apparatus. The compacted material not fixed in position by a binder can be removed, at step 412. At step 413, the substrate can be indexed to move the patterned and fixed material to a transfer station.

At step 414, the printed layer is transferred to the build substrate 80, or to the top of a stack of previously positioned layers 91 when directed by computer control system. A determination is made at step 415. Specifically, the process 400 determines whether the last layer was printed. If it is determined the last layer was printed at step 415, the process 400 advances to step 416 where the printing was ended. In contrast, the last layer was not printed at step 415, the process 400 advances to 417 where print instructions are sent for the next layer. After step 417, the process 400 cycles back through steps 404 to 417.

Figure 5:
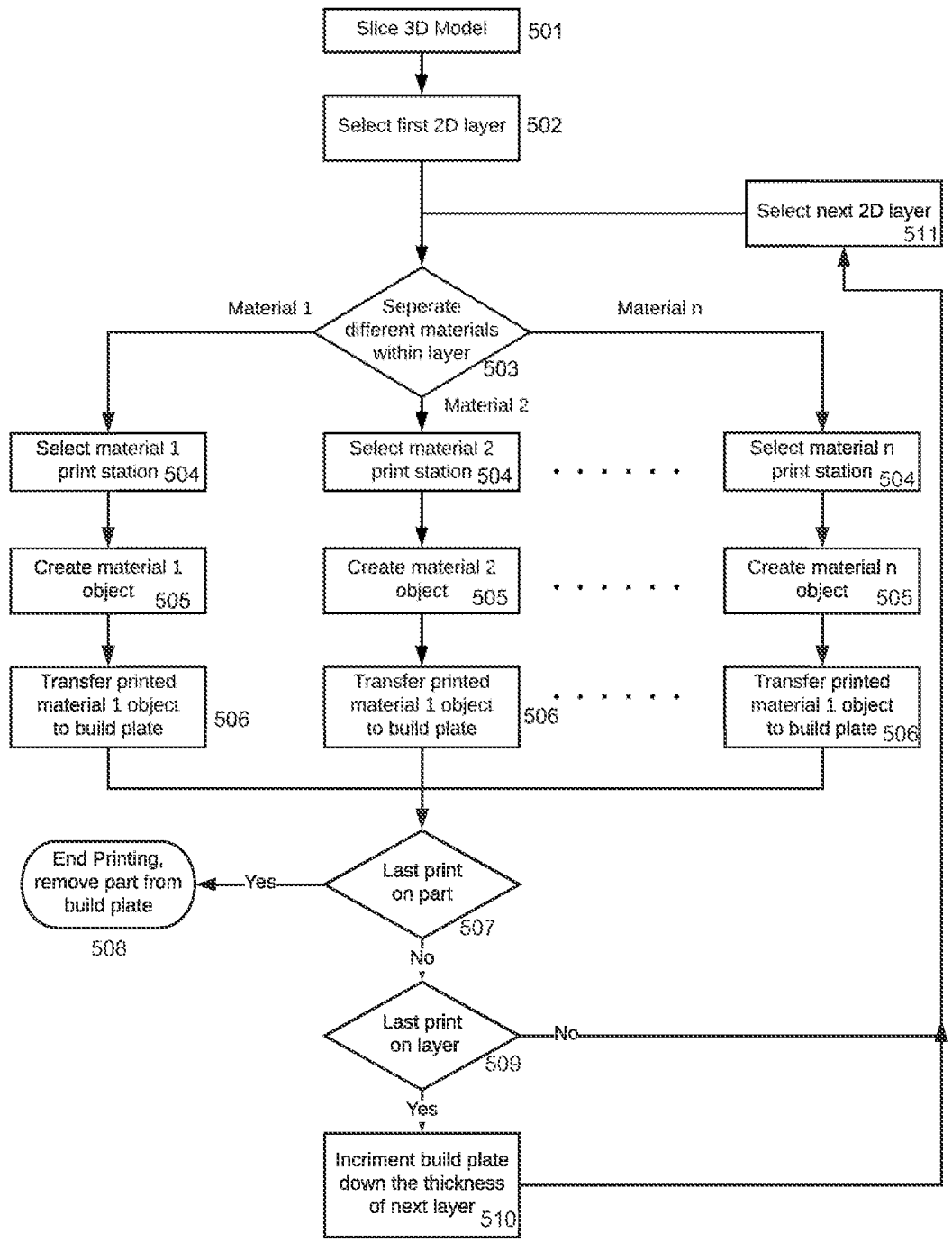
FIG. 5 depicts a flow chart describing a process for creating structures of two or more materials by the three-dimensional printer as a whole, in accordance with an implementation of the disclosure.

FIG. 5 depicts a flow chart describing the process 500 for creating structures of two or more materials by a three-dimensional printer, in accordance with an implementation of the present disclosure. The following description of the process 500 is described in detail with reference to the components of the three-dimensional printer of FIG. 2. The process 500 starts at step 501, where a multi-material object design is divided into print thickness layers. The first layer is then selected step 502. The different materials within the layer is identified at step 503. The steps 504-506 can be performed on each material identified within the layer.

Each material can be assigned to a print station 1, at step 504. The process 500 advances to step 505, where the material object is created by each print station 1. The printed material can be transferred to the build plate, at step 506. A determination is made as to whether the three-dimensional printer printed the last part at step 507. If is determined that the last part has been printed at step 507, the process 500 advances to step 508 where the printing is ended and the part is removed from the build plate. If it is determined that the last part has not been printed, then the process 500 advances to step 509 where it is determined whether the last print on the layer was completed. If it is determined that the last print on the layer was completed, then the process 500 advances to step 510 where the build plate is incremented down the thickness of the next plate. The process advances from steps 509 and 510 towards step 511, where the next layer is selected. At this point the process 500 continues from step 503. This process is continued until the last part has been printed (YES at step 507).

Figure 6:
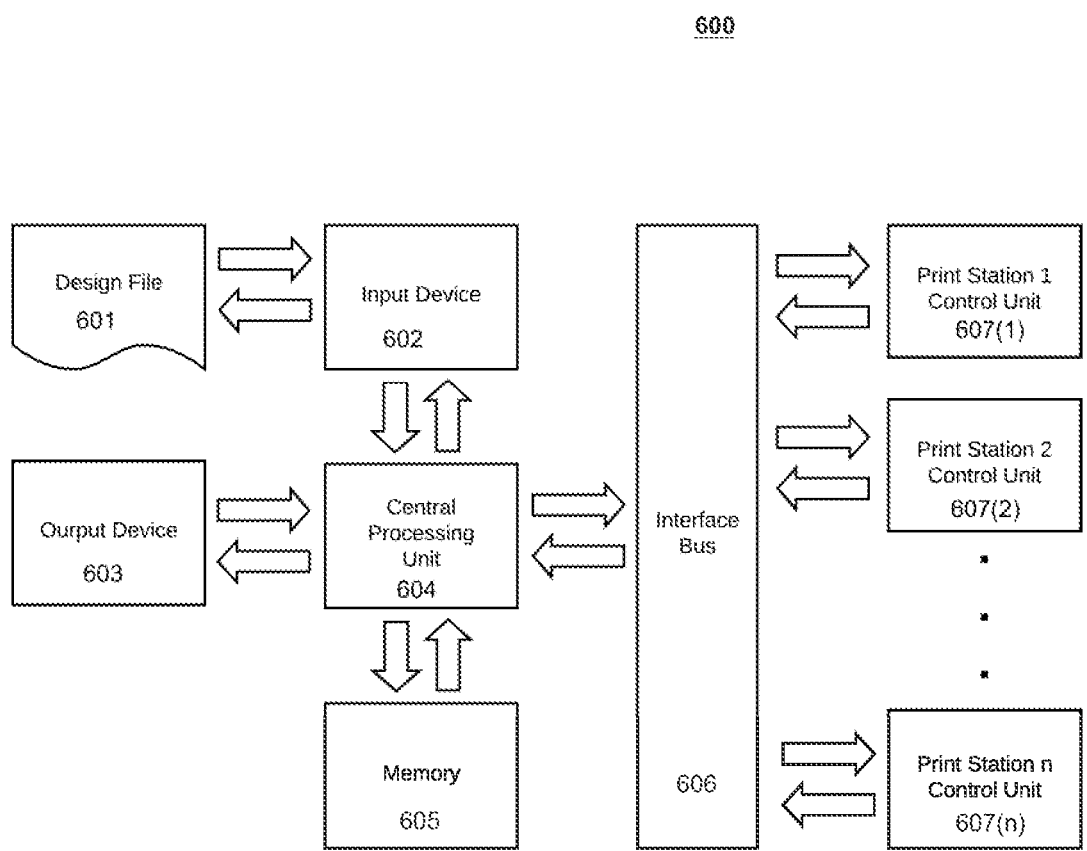
FIG. 6 illustrates a schematic representation a system level computing and control device, in accordance with an implementation of the disclosure.

FIG. 6 illustrates a schematic representation a system level computing and control device 600, in accordance with an implementation of the present disclosure. The computing and control device 600 can be a server, a personal computer, a portable computer, a thin client, or any suitable device or devices. The disclosure and/or components thereof may be a single device at a single location, or multiple devices at a single, or multiple, locations that are connected together using any appropriate communication protocols over any communication medium such as electric cable, fiber optic cable, or in a wireless manner. An input device 602 can receive print instructions, for instance from a pre-set CAD design file 601, to direct and coordinate the operation of all of the major components of the print station. The central processing unit 604, connected to the input device 602, an output device 603, and a memory 605 is configured to initiate the three-dimensional printing of the desired three-dimensional parts made up of two or more materials. Each material can be assigned to a specific print station 607(1), 607(2) up to 607(n) based on the amount of materials to be used. The central processing unit 604 can interface with each print station via the interface bus 606.

Figure 7:
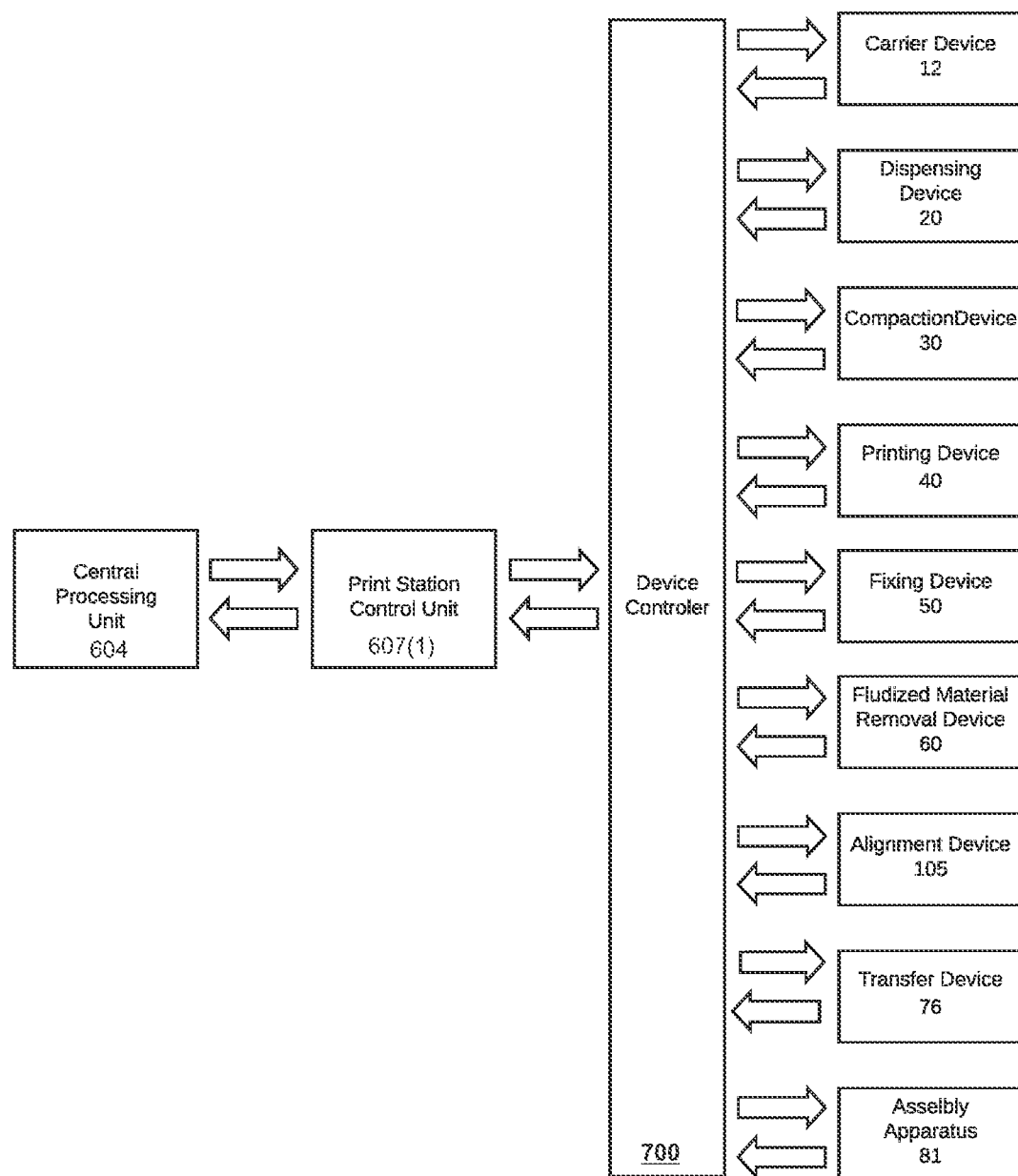
FIG. 7 illustrates a schematic representation of an individual print station controller, in accordance with an implementation of the disclosure.

FIG. 7 illustrates a schematic representation of an individual print station controller, in accordance with an implementation of the present disclosure. As indicated above, the central processing unit 604 can instruct the print station control unit 607(1) to print a print product of a specific material. The print station control unit 607(1) can convey the print instructions to the device controller 700, which corresponds with all of the components of the print station 1, as discussed above.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The terminology used herein is for the purpose of describing particular embodiments only and is not intended to limit the invention. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A method for creating structures of two or more materials using a multi-material three-dimensional printing apparatus, the method comprising:
   receiving print instructions to direct and coordinate operation of the multi-material three-dimensional printing apparatus to print a three-dimensional part, the three-dimensional part made up of two or more materials and having at least two print thickness layers, each of the at least two print thickness layers having at least one single material pattern;
   sending a first print instructions for a first single material pattern of the at least one single material pattern to a first print station within the multi-material three-dimensional printing apparatus;
   dispersing material of the at least one single material pattern on a first substrate;
   indexing the first substrate to move the dispersed material, via a first carrier device, to a first compaction apparatus where the material is compacted;
   indexing the first substrate to move the compacted material, to a printing apparatus where a binder is dispersed in a predetermined pattern on the compacted material;
   sending a second print instructions for a second single material pattern of the at least one single material pattern to a second print station within the multi-material three-dimensional printing apparatus;
   dispersing material of the second single material pattern of the at least one single material pattern on a second substrate;

moving the dispersed material of the second single material pattern, via a second carrier device, to a second compaction apparatus where the material is compacted; and transferring the at least two print thickness layers to a build substrate by using a transfer device, wherein the transfer device is positioned such that at any given time it has access to any one of the at least two print thickness layers, the transfer device configured to transfer the two print thickness layers in any desired order.

2. The method of claim 1, wherein receiving print instructions comprises:

dividing a multi-material object design into at least two print thickness layers; and separating each of the at least two print thickness layers into at least one single material pattern.

3. The method of claim 1, further comprising:

indexing the first substrate to move the patterned material to a fixing apparatus where the binder pattern is fixed with fixing radiation;

indexing the first substrate to move the fixed pattern to a fluidized material removal apparatus, where the compacted material not fixed in position by a binder is removed; and indexing the first substrate to move the patterned and fixed material to a transfer station, where at least one of the at least two print thickness layers is transferred to either a build substrate or to top a stack of previously positioned layers.

4. The method of claim 3, further comprising:

determining whether or not the patterned and fixed material was a last layer, and if not, sending instructions to the print station within the multi-material three-dimensional printing apparatus to print a next printed layer.

5. The method of claim 3, wherein moving the patterned and fixed material to the transfer station involves a pick-up assembly comprising an attachment apparatus configured to remove each of the at least two print thickness layers from the first substrate and the second substrate.

6. The method of claim 5, wherein the attachment apparatus comprises at least one of a vacuum apparatus or an adhesive apparatus configured to overcome a force holding the each of the at least two print thickness layers to the first or second substrate.

7. The method of claim 3, wherein moving the patterned and fixed material to the transfer station involves a translation apparatus configured to move the each of the at least two print thickness layers from the first substrate and the second substrate to an assembly apparatus in communication with the first print station and the second print station.

8. The method of claim 7, wherein the assembly apparatus comprises a build substrate and position reference fiducials to facilitate accurate placement of each print thickness layer onto the build substrate.

9. The method of claim 3, wherein the fluidized material removal apparatus comprises a vacuum apparatus, a disruptive apparatus, and an air knife.

10. The method of claim 3, wherein the fixing apparatus is configured to provide at least one radiant energy source selected from a group of IR radiation, UV radiation, and electron beam.

11. The method of claim 1, further comprising:

instructing, by central processing unit within the multi-material three-dimensional printing apparatus, the first and the second print stations to print a specific material based on the instructions.

12. The method of claim 1, wherein the first compaction apparatus comprises a settling apparatus configured to provide vibration and at least one of a compliant pressure cuff or a roller.

13. The method of claim 12, wherein the first compaction apparatus is configured to compact a fluidized material to a high density of at least 40% of a theoretical density of the fluidized material.

14. The method of claim 1, wherein the first print instructions are either same as the second print instructions or the first print instructions are different from the second print instructions.

15. The method of claim 1, wherein the first single material pattern is different from the second single material pattern.

16. A method for creating structures of two or more materials using a multi-material three-dimensional printing apparatus comprising a computer and a control device, the method comprising:

dividing a multi-material object design into at least two print thickness layers;

identifying different materials in one of the at least two print thickness layers;

for each of the identified materials in the one of the at least two print thickness layers:

sending at least one single material pattern to a print station within the multi-material three-dimensional printing apparatus;

creating a material object for the one of the at least two print thickness layers;

transferring the material object of the one of the at least two print thickness layers to a build substrate by using a transfer device; and stacking each material object in a single layer on the build substrate;

determining if all material objects for the one of the at least two print thickness layers have been printed and transferred to the build substrate;

incrementing a build plate down a thickness of a next layer if all different materials within the single layer have been printed, wherein structure of the build substrate comprises two or more distinct materials in two or more printed layers; and instructing, by a central processing unit of the computer, a print station control unit of the control device to print a specific material, wherein the transfer device is positioned such that at any given time it has access to any one of the at least two print thickness layers, the transfer device configured to transfer the two print thickness layers in any desired order.

17. The method of claim 16, wherein the print station control unit of the control device controls a plurality of devices.

18. The method of claim 17, wherein the plurality of devices comprises at least one of a carrier device, dispensing device, compaction device, printing device, fixing device, fluidized material removal device, alignment device, transfer device, and assembly apparatus.

19. The method of claim 18, wherein the transfer device comprises a translation device configured to move the printed layer from the build substrate to the assembly apparatus.

20. The method of claim 16, wherein the transfer device comprises a pick-up assembly comprising an attachment device configured to remove each of the two or more print thickness layers from the build substrate.

21. The method of claim 20, wherein the attachment device comprises at least one of a vacuum device or an adhesive device configured to overcome a force holding the printed layer to the build substrate.

22. The method of claim 20, further comprising alignment fiducials associated with the build substrate to enable coordination with an alignment sensor on the attachment device and the control device, to align the material object on the build substrate and on top of a stack of previously positioned layers.

23. The method of claim 16, wherein the at least one single material pattern sent to the print station is dispersed on the build substrate.

* * * * *